United States Patent [19]

Lindqvist

[11] Patent Number: 5,195,406
[45] Date of Patent: Mar. 23, 1993

[54] POWER WRENCH
[75] Inventor: Kai G. Lindqvist, Älta, Sweden
[73] Assignee: Atlas Copco Tools AB, Stockholm, Sweden
[21] Appl. No.: 834,633
[22] Filed: Feb. 12, 1992
[51] Int. Cl.$^5$ .............................. B25B 23/151
[52] U.S. Cl. ................................ 81/467; 81/469
[58] Field of Search ............... 81/467, 469–470, 81/473–477; 173/176–178, 180

[56] References Cited
U.S. PATENT DOCUMENTS
4,881,435 11/1989 Hansson ....................... 81/469

Primary Examiner—D. S. Meislin
Attorney, Agent, or Firm—Frishauf, Holtz, Goodman & Woodward

[57] ABSTRACT

A power wrench with torque control means, comprising a spring biassed torque limiting mechanism, wherein mark means indicating the actual length of the biassing spring (22) are visible from outside the tool housing (10) through one or more apertures (30, 38), and a gauge element (40) movably supported on the tool housing (10) and carrying two interspaced marks (42, 43) adapted to be aligned with the spring length indicating mark means in a nominal output torque setting of the torque limiting mechanism.

6 Claims, 2 Drawing Sheets

POWER WRENCH

BACKGROUND OF THE INVENTION

This invention relates to a power wrench with torque control means, in particular a power wrench having a housing, a rotation motor, an output shaft, and a power transmission for coupling the motor to the output shaft and which includes a torque limiting mechanism comprising a cam means and a cam means biassing compression spring which is pretensioned between a thrust member associated with the cam means and an adjustable support member.

In tools of the above type, the degree of pretension of the cam biassing spring, i.e. the length of the spring, corresponds directly to the torque level at which the torque limiting mechanism is activated to accomplish termination of the torque delivery to the output shaft. Changes in the spring pretension is accomplished by adjustment of the support member, and for obtaining an easy checking of the actual setting of the spring pretension and, thereby, the output torque of the tool, there are provided marks on the support member and on the housing. The mark on the support element is visible from outside the tool through an aperture in the housing.

However, due to the outcome of tolerances on the details comprised in the tool, a certain setting of the support element relative to the tool housing of one tool represents a spring pretension level that is different from that of another tool with the same setting of the support element. Accordingly, the output torque level varies from one tool to another despite a uniform setting of the support element. This means that there is a problem and a difficulty in obtaining a reliable basic setting of the output torque of a tool.

The main object of the invention is to solve the above problem by providing a power wrench with a new and improved mark means which is independent of deviations caused by the outcome of tolerances on the details comprised in the tool, and which enables a correct and reliable basic setting of the torque limiting mechanism, which corresponds to a desired nominal output torque level of the tool.

Further objects and advantages of the invention will appear from the following detailed description of a prefered embodiment of the invention.

DETAILED DESCRIPTION

Figure 1:
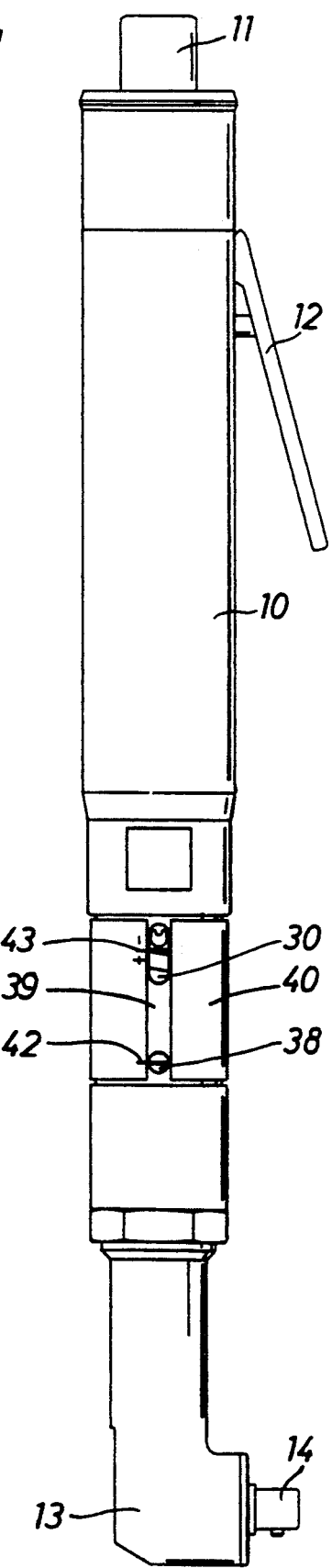
FIG. 1 shows a side view of an angle type power wrench according to the invention.

The power wrench shown in the drawing figures comprises a housing 10 which at its rear end is provided with a connection piece 11 for a pressure air conduit by which motive air is supplied to a pneumatic vane motor (not shown). The pressure air supply to the motor is controlled by a throttle valve which is maneuverable by a lever 12. At its forward end, the housing 10 is provided with an angle head 13 in which a square ended output shaft 14 is journalled.

Figure 2:
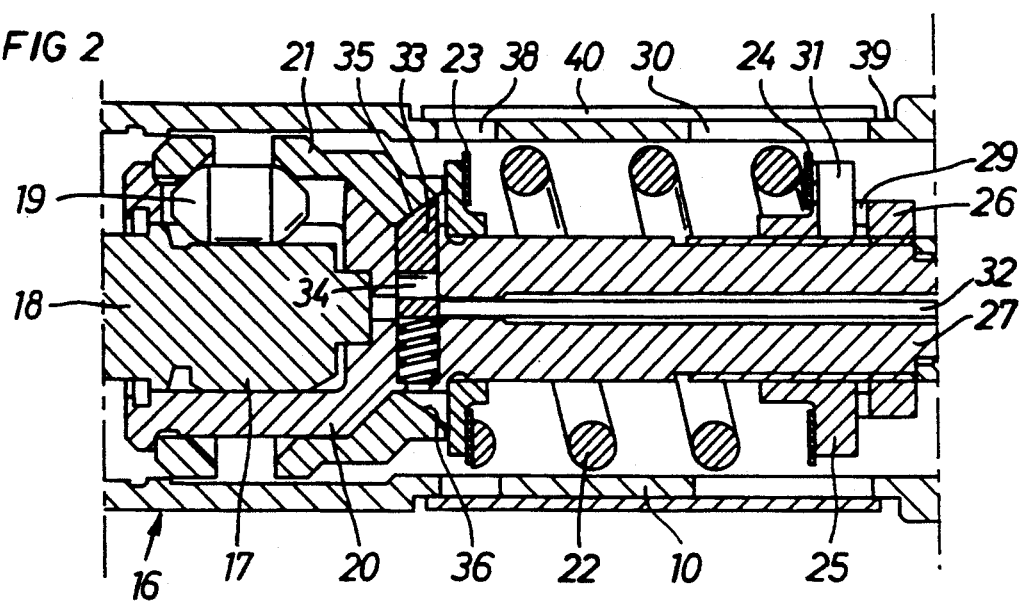
FIG. 2 shows, on a larger scale, a longitudinal section through the torque limiting mechanism of the tool in FIG. 1.
Figure 3:
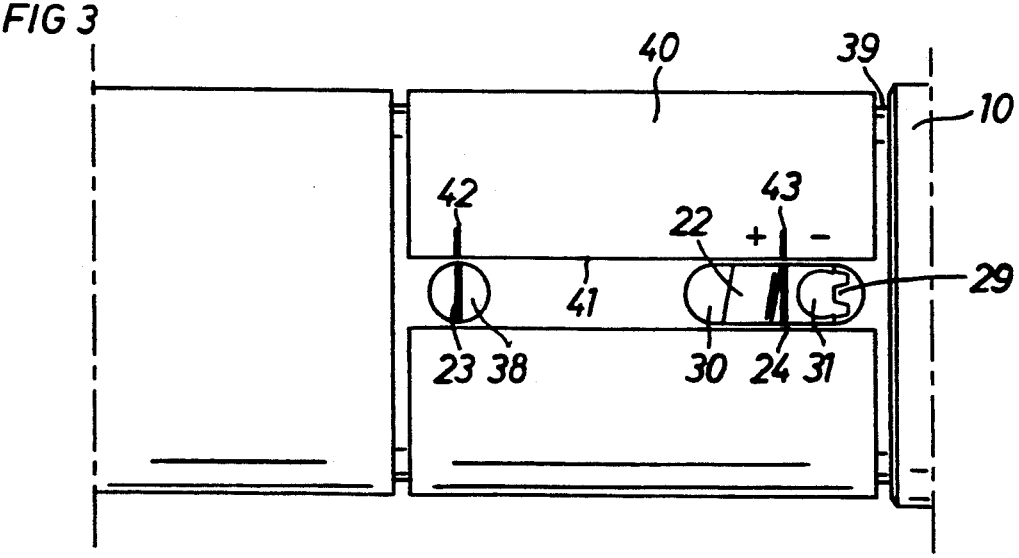
FIG. 3 shows, on a larger scale, a side view of a section of the tool in FIG. 1.

The power wrench further comprises a power transmission, not fully described in detail, by which the motor is coupled to the output shaft 14. The power transmission includes a torque limiting mechanism of a previously known type by which the torque delivery to the output shaft 14 is terminated as a certain torque level is reached. This mechanism comprises an override clutch 16 (see FIG. 2) with cam means in the form of cam lobes 17 on the driven clutch half 18, conically ended rollers 19 disposed in pockets on the driving clutch half 20 and an axially displaceable thrust sleeve 21. The clutch 16 also comprises a compression spring 22 which is pretensioned between a thrust washer 23 on which the thrust sleeve 21 is axially supported and a support washer 24. The latter is backed by a ring 25 and a nut 26 which is threadingly mounted on a drive spindle 27. The drive spindle 27 is formed in one piece with the driving clutch half 20, and the nut 26 is formed with teeth 29 to be engaged by the teeth of a torque setting key to be introduced through an aperture 30 in the housing 10 and guided in a radial bore 31 in the ring 25.

The torque limiting mechanism also comprises motive air shut-off means in the form of a shut-off valve (not shown) located in the air inlet passage, an activating rod 32, and a trip element 33 provided with a transverse bore 34. The activating rod 32 extends axially through the drive spindle 27 as well as through the motor and is axially supported on the trip element 33 in the operating condition of the tool, thereby maintaining the shut-off valve in open position (see FIG. 1). A slanted end portion 35 of the trip element 33 engages a conical inner surface 36 of the thrust sleeve 21 for camming action and a radial displacement of the trip element 33 when the sleeve 21 is moved axially.

When, during operation of the power wrench, a certain torque level is reached, the cam lobes 17 urge the conically ended rollers 19 outwardly, thereby causing an axial displacement of the thrust sleeve 21 against the action of the spring 22. As the rollers 19 reach the top crests of the cam lobes 17, the thrust sleeve 21 shifts 21 has shifted the trip element 33 such that the activating rod 32 falls into the bore 34, thereby causing closure of the throttle valve and a shut-off of the motor.

The support washer 24 and the thrust washer 23 are thin and visible from outside the tool housing through the aperture 30 and a smaller aperture 38. On a cylindrical waist portion 39 on the housing 10, there is movably supported a sleeve shaped gauge element 40. The latter is formed with a longitudinal slot 41 and carries at one edge of the slot 41 two axially spaced marks 42, 43. The distance between these two marks 42, 43 is chosen so as to correspond to that particular distance between the thrust washer 23 and the support washer 24, that in turn corresponds to a certain length of the spring 22 and, thereby, a desired basic setting of the torque limiting mechanism. Such a basic setting corresponds to a nominal output torque which is chosen within the available torque range of the tool with respect to the intended application of the tool.

Setting of the nominal output torque of the tool is carried out by moving the gauge sleeve 40 so as to obtain alignment of the left hand mark 42 with the thrust washer 23. Then, without moving the sleeve 40, the support washer position is adjusted by a set key introduced through the aperture 30. When the support washer 24 is aligned with the right hand mark 43 on the sleeve 40, the basic setting is obtained.

By making both the support washer 24 and the thrust washer 23 thin and by arranging two interspaced marks 42, 43 on a movable gauge sleeve 40, it is possible to obtain an accurately adjusted length of spring 22 and thereby provide a very precise setting of the output torque of the tool. The arrangement according to the invention makes it possible to compensate for occurring deviations in the thrust washer location resulting from the outcome of tolerances on the details comprised in the tool.

It is to be noted that the embodiments of the invention are not limited to the shown and described example. Accordingly, the gauge element may be designed otherwise as may the marks on the support and thrust washers.

I claim:

1. A power wrench with torque control means, comprising:
    a housing including therein a rotation motor, an output shaft, and a power transmission coupling said rotation motor to said output shaft;
    said power wrench further including a torque limiting mechanism having:
        cam means; and
        a pretensioned cam means biasing compression spring positioned between a thrust member operationally coupled with said cam means and an adjustable support member;
    said thrust member and said adjustable support member being arranged to provide an indication of a length of said pretensioned cam means biasing compression spring;
    said housing being provided with at least one aperture for enabling at least a portion of both said thrust member and said adjustable support member to be visible to a viewer of said power wrench;
    a gauge element movably supported on said housing, and positioned to be in parallel with said at least one aperture;
    said gauge element including thereon two marks for enabling a comparison of said two marks respectively with said visible portions of said thrust element and of said visible adjustable support element;
    said two marks on said gauge element being spaced apart by a distance equal to a spacing between said visible thrust element and said visible adjustable support element that exists when said pretensioned cam means biasing compression spring has a predetermined pretension that corresponds to a basic setting of said torque limiting mechanism.

2. The power wrench according to claim 1, wherein said gauge element is supported in a recess in said housing, said recess being larger than said gauge element, thereby enabling said gauge element to move within said recess.

3. The power wrench according to claim 2, wherein:
    said recess comprises a cylindrical waist portion formed on said housing;
    said gauge element includes a cylindrical sleeve having a longitudinal slot; and
    at least one of said two marks of said gauge element is positioned at an edge portion of said longitudinal slot.

4. The power wrench according to claim 3, wherein:
    said slot includes two edge portions; and
    said two marks of said gauge element are positioned respectively at each one of said two edge portions of said slot.

5. The power wrench according to claim 1, wherein said housing is provided with two apertures for respectively enabling at least portions of said thrust member and said adjustable support member to be visible to said viewer therethrough.

6. The power wrench according to claim 1, wherein said thrust element and said adjustable support element respectively have a thin cross-sectional area to provide a visible indication of said length of said pretensioned cam means biasing compression spring.

* * * * *